Jan. 9, 1940.  L. W. WILLIAMS  2,186,440
FILTERING UNIT AND METHOD OF MAKING THE SAME
Filed Aug. 3, 1937    2 Sheets-Sheet 1
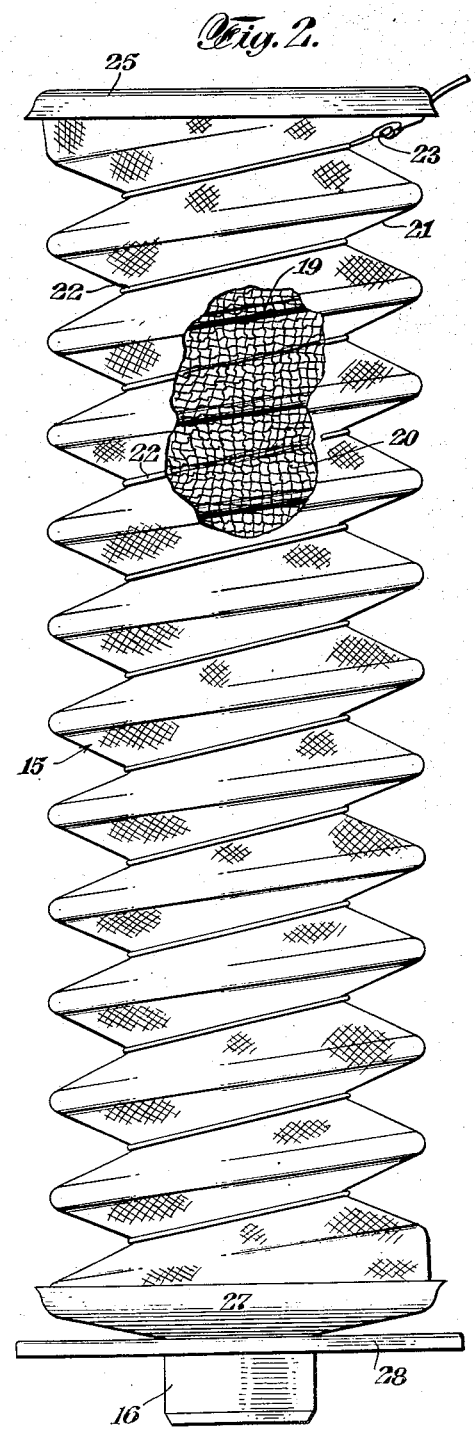
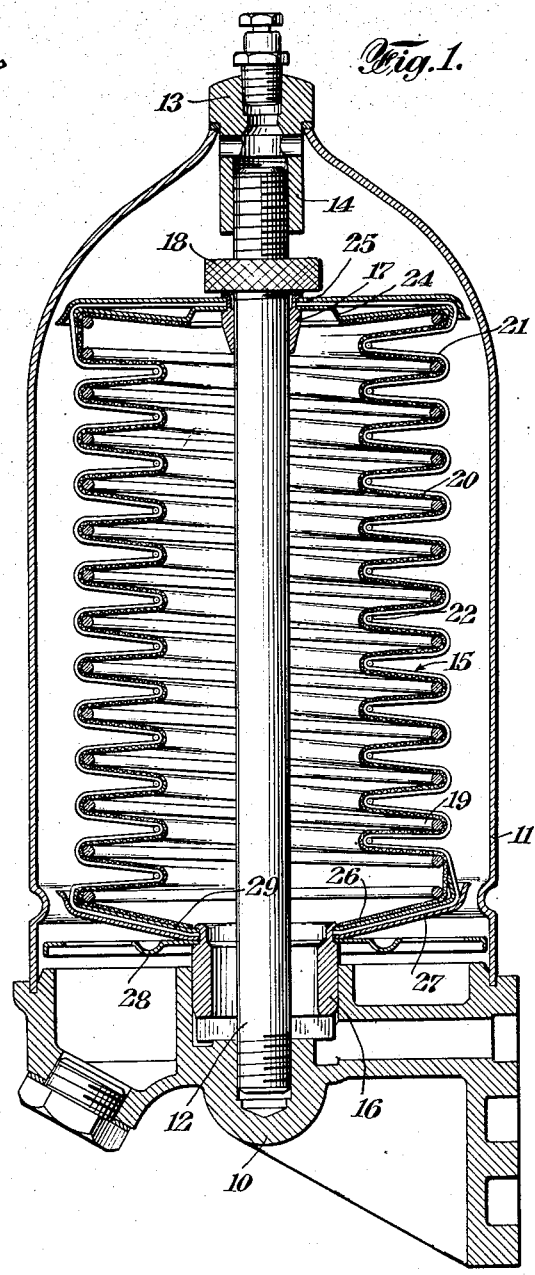
INVENTOR
Lewis W. Williams
BY Kenyon & Kenyon
ATTORNEYS

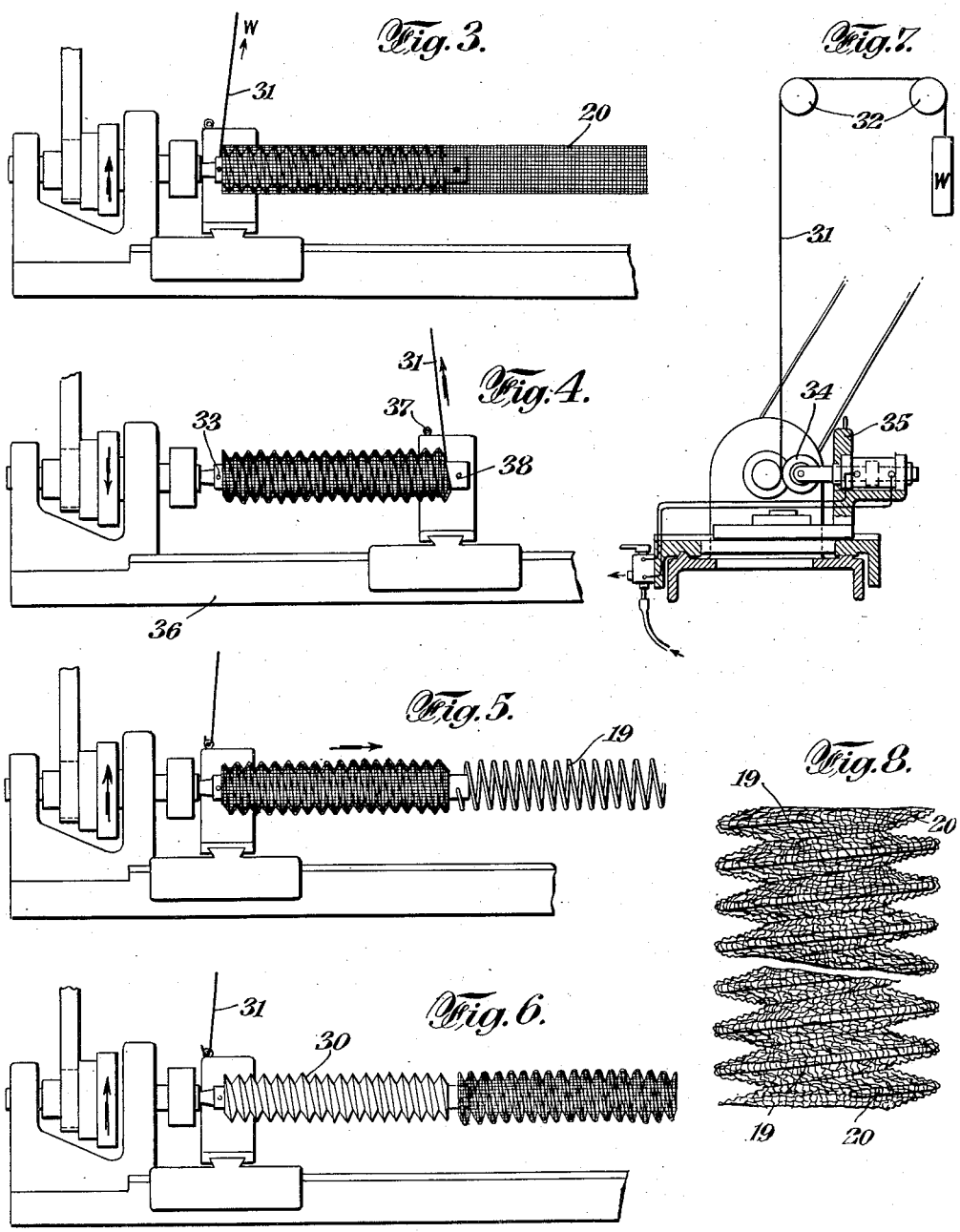

Patented Jan. 9, 1940

2,186,440

UNITED STATES PATENT OFFICE 2,186,440

FILTERING UNIT AND METHOD OF MAKING THE SAME

Lewis W. Williams, Short Hills, N. J., assignor to Motor Improvements, Inc., Newark, N. J., a corporation of Delaware Application August 3, 1937, Serial No. 157,098

3 Claims. (Cl. 210—169)

This invention relates to filtering units and a method of making the same.

In the patent to Robert P. F. Liddell, No. 1,741,705 is disclosed a filtering unit comprising a helical frame surrounded by an envelope of filtering material which is drawn inwardly between the adjacent turns of the helix by means of a wire or the like. When such a filtering unit is used for outside-in filtration it sometimes happens that adjacent sections of the filtering material are pressed into contact and by that much reduces the effective filtering area.

An object of this invention is a filter of the aforementioned type provided with means for positively maintaining clearance between adjacent sections of the filtering material.

In one embodiment of the invention, the helical frame is enclosed in a wire mesh tube which is inwardly extended between the frame turns and which forms a support for the filtering material. The wire mesh tube is properly shaped before assembly with the frame and the latter is introduced into the former by rotation in the same manner that a bolt is screwed into a nut. After assembly of the wire mesh tube with the frame, the filtering envelope is slipped over and is drawn down against the metal frame by winding a wire or the like in the spiral groove formed in the wire mesh tube.

Other objects, novel features and advantages of this invention will become apparent from the following specification and accompanying drawings, wherein:

Fig. 1 is a vertical section through a filter provided with a filtering unit embodying the invention;

Fig. 2 is a side elevation partly broken away of the filtering unit;

Figs. 3 to 6 inclusive are side elevations of an apparatus for use in shaping the wire mesh tube, these views being illustrative of four stages in the shaping of the tube and assembly thereof with the frame;

Fig. 7 is a section substantially on the line 7—7 of Fig. 6, and

Fig. 8 is an elevation of the shaped wire mesh tube with the frame inserted;

A base 10 is provided with a circular groove into which fits the lower end of a casing 11, the upper end of which is tapering and terminates in a relatively small aperture. A post 12 is screwed into a threaded socket in the base 10 and extends nearly to the top of the casing 11. A nut 13 has a boss 14 extending through the aperture in the top of the casing 11 and having a threaded connection with the top of the post 12. The head 10, casing 11 and nut 13 constitute an enclosure for the filtering element 15 which surrounds the post 12.

At its lower end, the filtering element 15 is provided with a collar 16 which fits into a recess in the base 10 and is of larger interior diameter than the exterior diameter of the post 12. At the upper end of the filtering unit 15 is provided a collar 17 which snugly but slidably fits the post 12 and is engaged by an adjusting nut 18. A frame 19 consisting of a spiral wire is enclosed by a wire mesh tube 20 which is inwardly extended between the frame turns to form a spiral channel from one end of the frame to the other. A tubular envelope 21 of filtering cloth such as cotton flannel or the like surrounds the wire mesh tube and is drawn into the spiral groove by a flexible wire 22 or the like, the ends of which are attached to eyelets 23 provided on the exterior of the envelope 21. The upper end of the envelope 21 extends across the upper end of the frame 19 to the sleeve 17 and is clamped between the inner edges of an annular metal disk 24 and an annular metal cap 25, the inner edges of which fit into a reduced portion of the sleeve 17 and are firmly held by heading over the end of the sleeve 17. The lower end of the envelope 21 extends across the bottom of the frame 19 to the collar 16 and is clamped between the inner edges of the annular disk 26 and cap 27, which inner edges engage a reduced portion of the sleeve 16. Also, a spider 28 has a central aperture, the edge of which fits into said reduced portion of the sleeve 16 and the edges of said spider, cap and disk are firmly held by heading over the inner end of the sleeve 16. A metal plate 29 engages the bottom end of the frame 19 and has an aperture through which the post 12 extends. The disks 24 and 26 are provided with flanges which fit around the top and bottom turns of the helix and serve to clamp in place the wire mesh tube 22, the ends of which are turned inwardly toward the post 12.

In Figs. 3 to 7 inclusive, 30 is a mandrel having a spiral groove and is rotated in any suitable manner. This mandrel is used in the shaping of the wire mesh tube 20 which while in cylindrical form is passed over the mandrel and suitably fixed thereto, the tube when in cylindrical form being of considerably greater length than the mandrel. A flexible wire or cable 31 passes over a pair of guide rolls 32 and has one end attached to the weight W. The other end is provided with a hook which is engaged with an eyelet 33 on the mandrel 30. The mandrel is then rotated and the wire 31 is wound into the spiral groove on the mandrel to pull the wire mesh tube into the spiral grooves, thus giving the tube the desired shape. A V-shaped roller 34 is carried by a head 35 slidably supported by the head 36 which also supports the mandrel 33 and means (not shown) are provided for causing the head 35 to move lengthwise of the mandrel in proper timed relation to cause the roller 34 to feed along the groove in the tube 20 and force the wire mesh into engagement with the mandrel groove, thereby producing a smooth surface in the groove of the wire mesh tube. After the wire mesh tube has been shaped, the mandrel 33 is rotated in the reverse direction to unwind the cable 31 and the head 35 is returned to its original position. The cable is now unhooked from the eyelet 33 and is hooked into an eyelet 37 on the head 35. Next, the frame 19 is arranged in axial alinement with the mandrel 30 and is attached thereto by a projection from the end coil which passes through the hole 38 in the end of the mandrel. The shaped tube 20 is then screwed on to the frame 19 by simultaneously rotating the mandrel 30 and the frame 19 while the tube is held against rotation. The mandrel 30 feeds the tube on to the frame after which the latter is disengaged from the mandrel and the extension on the end coil is removed.

Fig. 8 illustrates the wire mesh tube in place on the frame. The assembled frame and wire mesh tube are next enclosed in the envelope 21 and the various caps and disks properly arranged and fastened in position, thus forming the complete filtering unit. This filtering unit is slipped over the post 12 and the collar 16 arranged in its socket after which the nut 18 is screwed on to the end of the post 12 and into engagement with the cap 25 to hold the filtering unit assembled with the base. The casing 11 is then passed over the filtering unit and the nut 13 threaded on to the end of the bolt 12 to complete the assembly.

I claim:

1. A filter comprising a helical metal frame, a tube enclosing said frame, said tube being composed of a single sheet of wire mesh and being provided with a spiral groove extending inwardly between frame turns, an envelope of filtering material surrounding said frame and tube, and means for maintaining said filtering material in contact with the surface of said tube.

2. A filter comprising a helical metal frame, a tube enclosing said frame, said tube being composed of a single sheet of wire mesh and being provided with a spiral groove extending inwardly between frame turns, an envelope of filtering material surrounding said frame and tube, and a wire or the like drawing said filtering material into said spiral groove in contact with the faces thereof.

3. A filter comprising a helical metal frame, a tube having a spiral interior and a spiral exterior groove and being composed of a single sheet of wire mesh, said frame having its turns received in said interior groove, an envelope of filtering material surrounding said tube and being fitted into said exterior groove, and a wire or the like wound over said envelope to draw the latter into contact with the bottom of said exterior groove.

LEWIS W. WILLIAMS.